(12) United States Patent
Lam et al.

(10) Patent No.: US 12,135,824 B2
(45) Date of Patent: Nov. 5, 2024

(54) SYSTEM AND METHODS FOR AUDITABLE DATA MANAGEMENT

(71) Applicant: Hong Kong Applied Science and Technology Research Institute Co., Ltd., Shatin (HK)

(72) Inventors: Tak Wing Lam, Hong Kong (CN); Kwok Fai Ng, Ma On Shan (HK); Tak Fuk Wong, Hong Kong (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 330 days.

(21) Appl. No.: 17/711,816

(22) Filed: Apr. 1, 2022

(65) Prior Publication Data
US 2023/0315910 A1    Oct. 5, 2023

(51) Int. Cl.
*G06F 21/64* (2013.01)
*H04L 9/30* (2006.01)
*H04L 9/32* (2006.01)

(52) U.S. Cl.
CPC ............ *G06F 21/64* (2013.01); *H04L 9/3073* (2013.01); *H04L 9/3247* (2013.01)

(58) Field of Classification Search
CPC ..... G06F 21/64; H04L 9/3073; H04L 9/3247; H04L 9/50
See application file for complete search history.

(56) References Cited

U.S. PATENT DOCUMENTS

| | | | |
|---|---|---|---|
| 8,311,918 B2 * | 11/2012 | Baumann | G06Q 40/03 705/7.11 |
| 8,868,914 B2 * | 10/2014 | Teppler | H04L 9/3297 713/176 |

(Continued)

FOREIGN PATENT DOCUMENTS

| | | |
|---|---|---|
| CN | 110636511 A | 12/2019 |
| CN | 111626853 A | 9/2020 |

(Continued)

OTHER PUBLICATIONS

Patent Cooperation Treaty, International Search Report and Written Opinion issued for PCT Application No. PCT/CN2022/085636, dated Nov. 25, 2022, 8 pages.

*Primary Examiner* — Sm A Rahman
(74) *Attorney, Agent, or Firm* — Norton Rose Fulbright US LLP

(57) ABSTRACT

Systems and methods which provide for auditable data are described. Data management systems of embodiments facilitate storage and management of various data (e.g., information regarding transactions, customers, infrastructure, geographic locations, medical records, etc.) for supporting data creation, manipulation, storing, and/or sharing by and among different parties. Users may create new and/or update data, digitally sign the data, and store the digital signature and data on immutable storage using data structures of a data management system. A data structure in which data and associated metadata is stored on immutable storage in association with a digital signature corresponding to the data and user may be used in providing data traceability and auditability. Snapshots of merged data may be implemented with respect to data having many updates to (Continued)

avoid delays in merging update data for queries for that data. A collaborative rating mechanism may provide trust levels with respect to the data.

20 Claims, 8 Drawing Sheets

(56) References Cited

U.S. PATENT DOCUMENTS

| | | |
|---|---|---|
| 10,552,381 B2 | 2/2020 | Bastide et al. |
| 2021/0192084 A1 | 6/2021 | Wilbrecht |
| 2021/0334879 A1 | 10/2021 | Sussman et al. |
| 2023/0237437 A1* | 7/2023 | Stewart .............. G06Q 10/1053 705/321 |
| 2023/0252181 A1* | 8/2023 | Nagao .................. H04L 9/0643 713/164 |

FOREIGN PATENT DOCUMENTS

| | | | |
|---|---|---|---|
| CN | 111949733 A | 11/2020 | |
| CN | 112560056 A | 3/2021 | |
| CN | 113568921 | 10/2021 | |
| CN | 113592657 A | 11/2021 | |
| CN | 110941511 B * | 3/2023 | .......... G06F 11/1435 |
| WO | WO-2021208909 | 10/2021 | |

\* cited by examiner

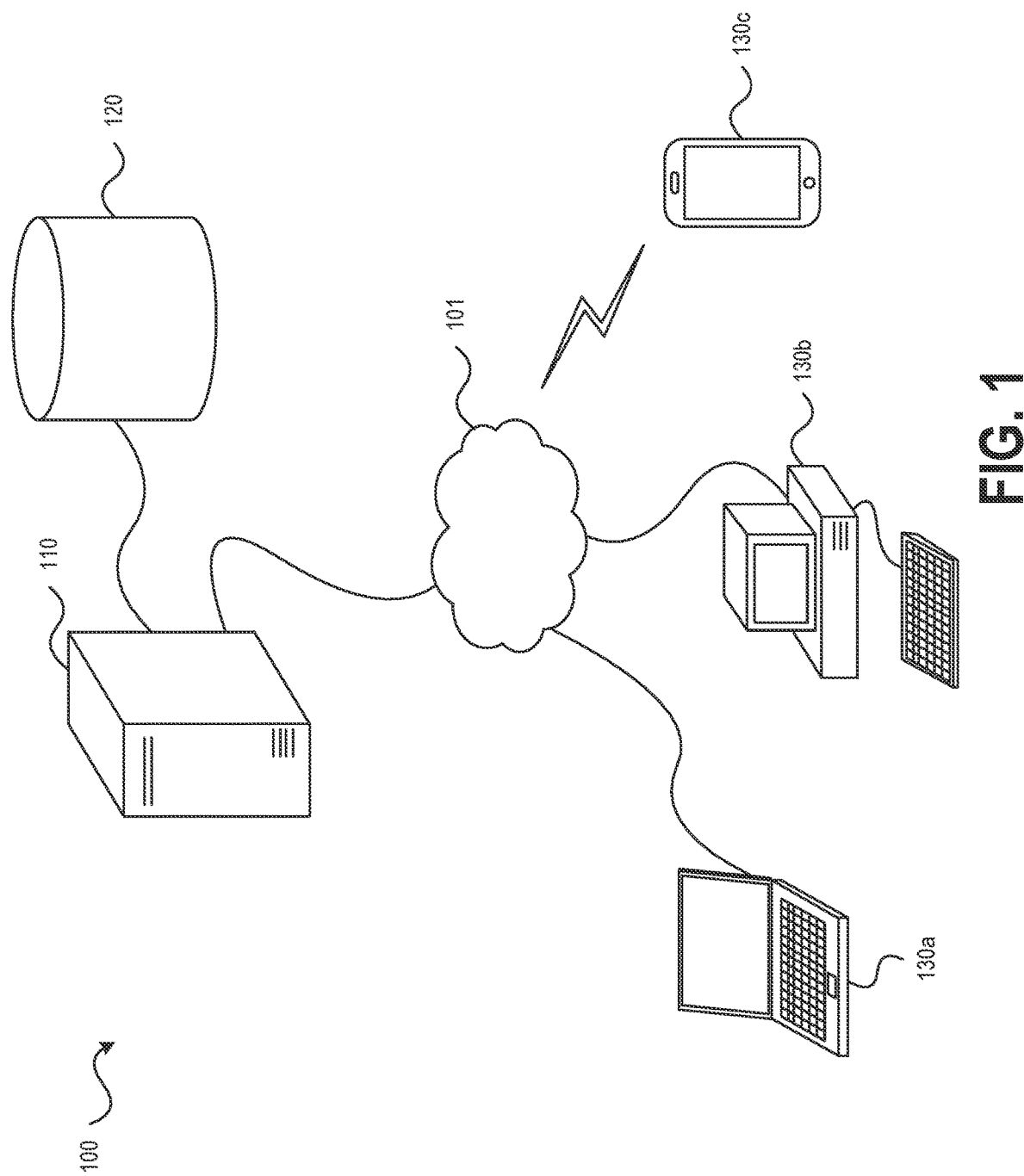

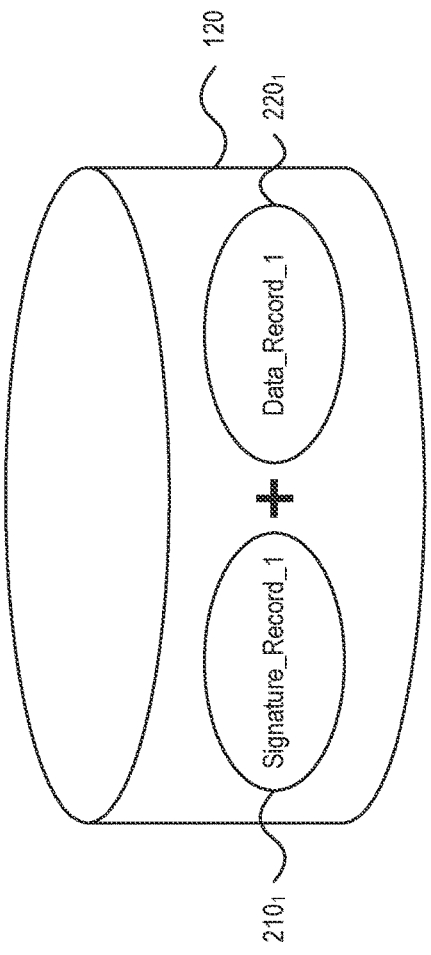
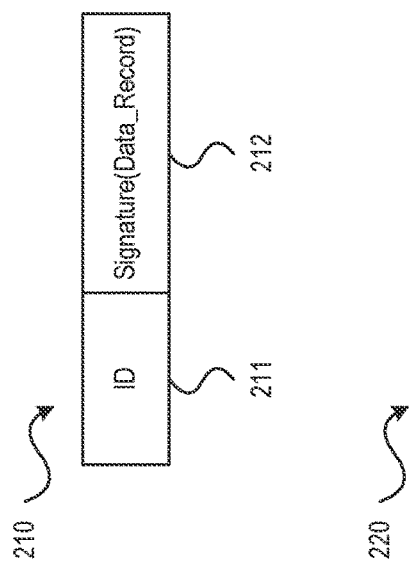
FIG. 2A
FIG. 2B
FIG. 2C

SYSTEM AND METHODS FOR AUDITABLE DATA MANAGEMENT

TECHNICAL FIELD

The present invention relates generally to data management and, more specifically, to auditable data management techniques.

BACKGROUND OF THE INVENTION

The generation, collection, aggregation, and management of data of various types has become more and more prevalent in today's society. For example, with the proliferation of processor based systems, and their nearly ubiquitous interconnectivity, large amounts of data are created, manipulated, stored, and shared in day to day activities of businesses and individuals. The data, for example, may comprise information regarding transactions, customers, infrastructure, geographic locations, medical records, etc. The ability to validate, verify, and/or audit such data, to manage updates to the data, and provide other aspects of data management can present considerable challenges, particularly where there is a large amount of data, a large number of users creating and updating the data, or a large amount of updates or other revisions made to the data.

Geographic spatial data (Geodata) is an example of data type for which large amounts of data are created, manipulated, stored, and shared. Geodata are data associated with a location relative to Earth. For example, a large collection of Geodata may form core infrastructure (e.g., three-dimensional (3D) city model and sensor data) for supporting smart city applications. The typical file size of Geodata is generally quite large, often in the range of 100 MB to 500 MB.

The management of Geodata can present a number of challenges. For example, Geodata are provided by a number of often unrelated different parties. Geodata may, for example, comprise Building Information Modeling (BIM) data for enabling intelligent software modeling used to collaborate on building design, operation, and/or management. BIM data may be created by various entities, such as architects, water and sewer infrastructure providers, telecom and communication infrastructure providers, power supply infrastructure providers, etc., involved in the design, construction, operation, and/or maintenance of one or more respective buildings. Further, Geodata often requires cumulative updates. In the example of BIM, significant portions of the Geodata may be updated during different construction phases (e.g., planning, designing, building, and operating). Different parties may thus update the Geodata from time to time.

Due to the nature of Geodata being provided by different parties, it can be particularly difficult to verify and audit the changes to the Geodata. With the Geodata being changed from time to time by different parties, it is difficult to verify the parties and audit the changes. Further, it can be quite difficult for a single party to validate the Geodata. Accordingly, traceability and auditability of the data comprising the Geodata is often impractical or uncertain. Additionally, cumulative updates to data of the Geodata can lead to inefficient querying of the data (e.g., long wait times may be experienced in association with a server merging the various updates to data of the Geodata).

Prior solutions for managing geographic data and other data types for which large amounts of data are created, manipulated, stored, and shared have not fully addressed the forgoing and other challenges. For example, the techniques for multi-person geographic information data production and update described in CN 113568921 A provide for geographic information data production and updating. Operation according to CN 113568921 A carries out centralized management on mass data in a server and multi-person offline cooperative operation editing in a client. An enterprise-level geographic database is used in which a database administrator (e.g., SQL DBA) is relied upon to configure and ensure data security. The solution of CN 113568921 A is not well suited for facilitating traceability and auditability of the geographic information data as provided and updated by the multiple persons. Moreover, query optimization as may be implemented by the database administrator is not well suited for efficient querying of cumulative update data of a traceable data update chain.

U.S. Ser. No. 10/552,381 B2 provides a blockchain of transactions that may be referenced for various purposes and may be later accessed by interested parties for ledger verification. Operation according to U.S. Ser. No. 10/552,381 B2 may comprise determining that a shared file is being edited by one or more entities, identifying one or more changes to the shared file while the shared file is being edited, signing the one or more changes with one or more public keys, and adding the one or more changes to a blockchain. Although perhaps providing a relatively high level of security with respect to transaction data, operation in accordance with U.S. Ser. No. 10/552,381 B2 is inefficient, likely resulting in the use of considerable computing and storage resources, as well as appreciable delays in storing and querying data.

BRIEF SUMMARY OF THE INVENTION

The present invention is directed to systems and methods which provide for traceable and/or auditable data, such as in situations where large amounts of data (e.g., information regarding transactions, customers, infrastructure, geographic locations, medical records, etc.) are created, manipulated, stored, and/or shared by and among a number of different parties. Data management techniques of embodiments of the invention facilitate efficiencies with respect to storing and querying data. Additionally or alternatively, data management implemented according to concepts of the present invention facilitates validation of the data, such as to enable single party to efficiently and effectively validate the data.

Embodiments of the present invention implement a client-server model comprising servers with immutable storage. Users of the data management systems and methods may generate, or otherwise obtain, a private key and public key pair for use with respect to the data management system. In operation according to embodiments, users may create new and/or update data, digitally sign the data using a private key of the key pair, and store the digital signature and data on the immutable storage using a data structure according to concepts herein, whereby traceability and auditability is facilitated with respect to the data. Users may thus be enabled to store and/or update data shared by and among different parties, whereby traceability and/or auditability is facilitated with respect to the data according to embodiments of the invention. For example, a data structure in which data (e.g., new data and update data mapping to previously stored instances of new/update data) and associated metadata is stored on immutable storage in association with a digital signature corresponding to the data and user may be used according to embodiments for use in providing data traceability and auditability. Embodiments may further implement a technique for creating snapshots with respect to cumulatively updated data, whereby the query efficiency is improved with respect to the data. For example, snapshots of merged data may be implemented with respect to data having many updates to avoid delays in merging update data for queries for that data. Additionally or alternatively, embodiments of the invention may implement a rating technique providing a trust level with respect to the data, whereby efficient and effective validation of the data is facilitated. For example, a collaborative rating mechanism may provide trust levels with respect to the data (e.g., a server may perform matrix operation on the ratings to calculate trust levels), such as may be utilized by users to reduce time and effort on data validation.

According to some examples, systems and methods are configured for management of geographic spatial data (Geodata). The Geodata may, for example, comprise Building Information Modeling (BIM) data. Embodiments may operate to ensure that the Geodata are traceable and auditable. In accordance with some embodiments, the Geodata query efficiency is facilitated through the use of effective data structures including the use of data snapshots. Rating of users and Geodata may be implemented according to some embodiments for providing trust levels, as may be used in validating the Geodata according to concepts herein.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which:

FIG. 1 shows a data management system configured to facilitate auditable data management according to embodiments of the invention;

FIG. 2A shows an example of a data structure implemented with respect to a signature record according to embodiments of the invention;

FIG. 2B shows an example of a data structure implemented with respect to a data record according to embodiments of the invention;

FIG. 2C illustrates storage of a signature record in association with a data record on storage of a data management system according to embodiments of the invention;

DETAILED DESCRIPTION OF THE INVENTION

Figure 3A:
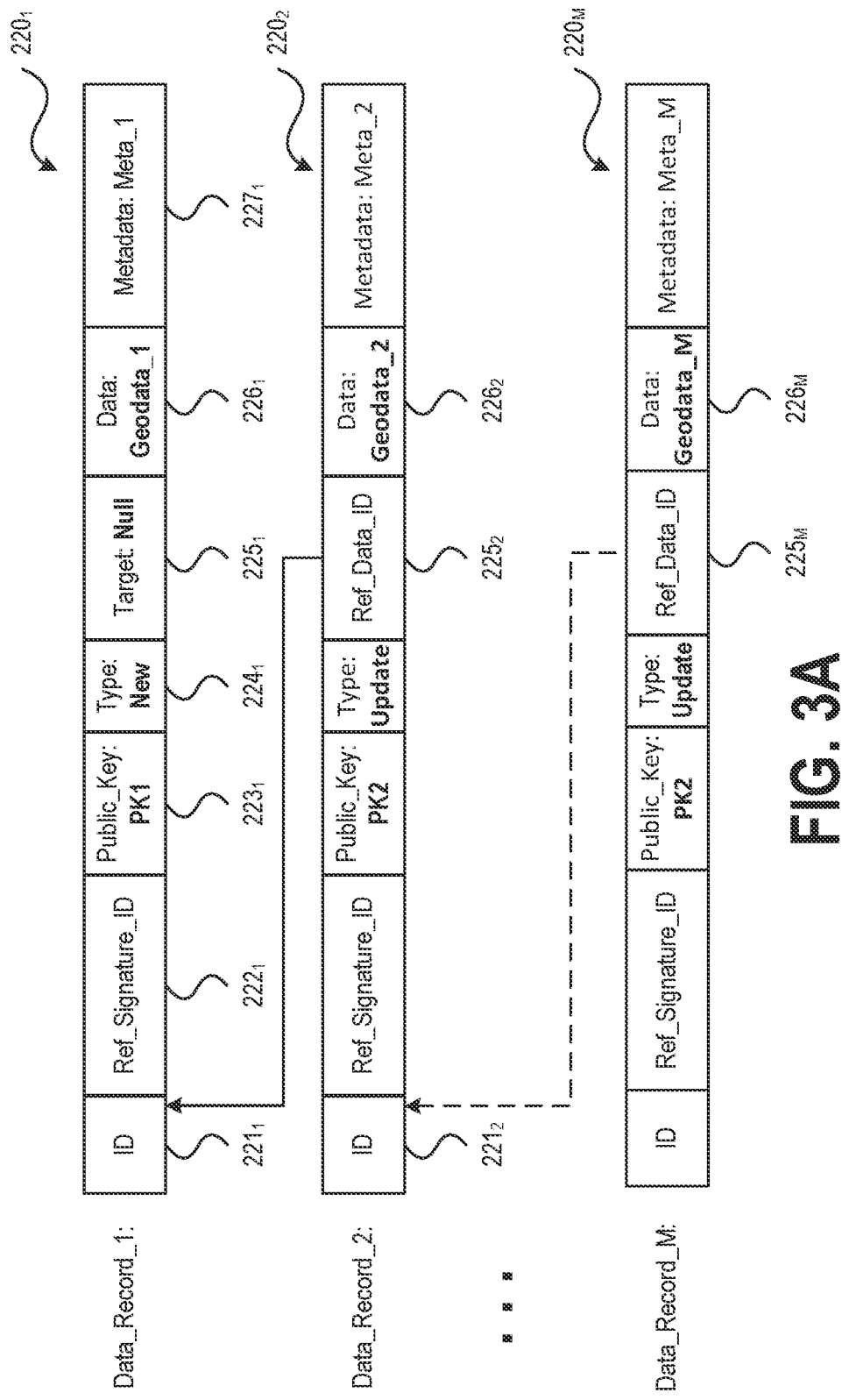
FIG. 3A shows detail with respect to examples of data records for new and update data as may be generated for storage and management by embodiments of a data management system according to embodiments of the invention.

FIG. 1 shows an embodiment of data management system 100 configured to facilitate auditable data management according to concepts of the present invention. Data management system 100 of the illustrated embodiment is configured to provide data traceability and auditability with respect to various types of data. Data for which auditable data management is provided by data management system 100 may comprise large amounts of data (e.g., information regarding transactions, customers, infrastructure, geographic locations, medical records, etc.) as may be created, manipulated, stored, and/or shared by and among a number of different parties.

As a specific example, data for which auditable data management is provided by data management system 100 may comprise geographic spatial data (Geodata). The Geodata may, for example, comprise Building Information Modeling (BIM) data. Although embodiments of data management system 100 are described herein with reference to Geodata in order to provide an example to aid in understanding concepts of the present invention, it should be appreciated that data management system 100 of embodiments may be utilized with respect to additional or alternative types of data.

Data management system 100 of FIG. 1 includes data management platform 110 operable to provide auditable data management functionality, such as for facilitating storing, updating, accessing, and/or sharing the data by and between users of data management system 100. Data management platform 110 may, for example, comprise one or more processor-based servers configured for controlling storage and access to data. Accordingly, data management platform 110 is coupled to, or otherwise in communication with, storage 120.

Storage 120 may comprise one or more forms of computer-readable media (e.g., various forms of tangible, non-transitory computer readable media). According to some embodiments of the invention, storage 120 may comprise random access memory (RAM), flash memory, disk memory, solid state disk (SSD) memory, optical memory, write once read many (WORM) memory, and/or the like. Storage 120 may comprise a storage array or other storage system, such as a redundant array of independent disks (RAID) array, a storage area network (SAN), a network attached storage (NAS) array, and/or the like. In operation according to embodiments of the invention, storage 120 may be utilized to store various information, including program code of data management logic (e.g., executed by one or more processors of data management platform 110), program code of client applications (e.g., executed by one or more processors of user devices 130), system and/or operational data (e.g., utilized by and/or with any or all of data management platform 110, user devices 130, and their various applications), data under management of data management platform 110, etc. Portions of storage 120 may comprise a part of one or more systems of data management system 100 (e.g., data management platform 110) and/or may be separate from such systems (e.g., provided as an independent database system).

Irrespective of the particular form or forms of media comprising storage 120, storage 120 of embodiments is configured to provide immutable storage with respect to data under management of data management platform 110. For example, media (e.g., WORM memory) of storage 120 may itself be configured to provide immutability with respect to some or all of the data stored thereon. Additionally or alternatively, data management platform 110 and storage 120 may operate cooperatively (e.g., implementing blockchain storage techniques) to provide immutability with respect to some or all the data stored on storage 120.

Data management system 100 of the illustrated embodiment provides a client-server configuration for management of data created, manipulated, stored, and/or shared by and among a number of different parties. Accordingly, data management platform 110 is shown in communication with various systems (e.g., user devices 130) as may be used by the users creating, manipulating, storing, and/or sharing data. In the example of Geodata as the data under management of data management platform 110, users of user devices 130 may comprise individuals associated with architects, water and sewer infrastructure providers, telecom and communication infrastructure providers, power supply infrastructure providers, etc., involved in the design, construction, operation, and/or maintenance of one or more respective buildings. User devices 130 may embody various forms and configurations of processor-based systems, such as portable computer systems (e.g., user device 130a), desktop computer systems (e.g., user device 130b), smartphones (e.g., user device 130c), tablet devices (not shown), personal digital assistants (not shown), Internet appliances (not shown), networked computer systems (not shown), and/or the like.

The illustrated embodiment of data management system 100 shows a representative example of the number and configuration of various devices, systems, and platforms therein for providing functionality with respect to data management. It should be appreciated, however, that the particular number and configuration shown is simplified in order to facilitate an understanding of the concepts of the present invention, and embodiments of the present invention are not limited to application to the particular representative number and configuration shown. Embodiments of data management system 100 may, for example, comprise a plurality of data management platforms and/or more or fewer user devices. Additionally or alternatively, data management system 100 may comprise devices, systems, and/or platforms in addition to those shown as may be utilized with respect to creating, manipulating, storing, sharing, etc. data.

The various devices, systems, platforms, and other components of data management system 100 may each comprise one or more processor-based systems. Such processor-based systems may comprise one or more processors, such as a CORE or PENTIUM processor; requisite computer/processor readable memory, such as RAM, read only memory (ROM), flash memory, disk memory, SSD memory, optical memory, and/or the like; and input/output components, such as display, network interface card (NIC), keyboard, digital pointer, printer, and/or the like; coupled to a processor of the one or more processors via a data bus) operable to provide functionality as described herein. For example, data management platform 110, storage 120, and/or user devices 130 may comprise memory storing logic configured to provide their respective functions, wherein at least one processor thereof may execute the logic to implement functionality as described herein.

Network 101 of the illustrated embodiment provides communication links facilitating communication between various devices, systems, and other components of data management system 100, such as by and between some or all of data management platform 110, storage 120, and/or user devices 130. Accordingly, network 101 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like. The communication links between various nodes of the network may comprise wired links, wireless links, and combinations thereof.

Data management platform 110 of embodiments may be provided in a cloud-based implementation (e.g., data management platform 110 is present in the "cloud" of network 101 of data management system 100) accessible to various devices, systems, and other components in communication with network 101. For example, data management platform 110 of some embodiments, or portions thereof, may comprise computer executable code executing on one or more processor-based systems (e.g., web servers) deployed in network 101. Additionally or alternatively, data management platform 110, or portions thereof, may comprise one or more discrete host platforms (e.g., network edge devices) or other forms of processor-based system implementations in communication via network 101.

Data management platform 110 of embodiments of data management system 100 is operable in cooperation with one or more of user devices 130 to provide various functionality associated with creating, manipulating, storing, and/or sharing data. Data management platform 110 of embodiments may, for example, provide functionality for auditable data management, such as to provide data traceability and auditability with respect to one or more types of data according to concepts of the present invention. User devices 130 of embodiments may provide functionality for users interacting with data management platform 110, such as to facilitate users creating, updating, and accessing the data under management by data management platform 110. Accordingly, data management platform 110 of embodiments includes server-implemented data management logic (e.g., one or more processor executable instruction sets) configured to facilitate operation for auditable data management. Correspondingly, user devices 130 of embodiments include client-implemented data interface logic (e.g., one or more processor executable instruction sets) configured for cooperation with server-implemented data management logic to facilitate creating, updating, and accessing the data under management by data management platform 110.

In operation of an example of data interface logic executed by a user device of user devices 130, the user device generates, or otherwise obtains, a private key and public key pair for use with respect to data management system 100. For example, the data interface logic may implement an asymmetric cryptography algorithm (e.g., Rivest-Shamir-Adleman (RSA), digital signature algorithm (DSA), elliptic-curve cryptography (ECC), etc.) to generate a private key and public key pair. The public key of the private key and public key pair may be utilized to represent the user in the data management system.

A user may utilize a respective one or more of user devices 130 to create new data that is to be subject to management by data management system 100. Additionally or alternatively, a user may utilize a respective one or more of user devices 130 to update data under management of data management system 100. In operation of an example of data interface logic executed by the user device, the data is digitally signed using a private key of the private key and public key pair and a signature record comprising the digital signature is created. The data interface logic executed by the user device of the example may also create a data record comprising the data (e.g., new data, update data, etc.) for management by data management system 100.

An example of a data structure implemented with respect to a signature record is shown in FIG. 2A as signature record 210. In the example of signature record 210, identification (ID) field 211 comprises an identifier for the signature record. An identifier of ID field 211 may, for example, comprise a unique identifier of the signature record, such as may be utilized in associating the signature record with a corresponding data record (e.g., data record comprising new data, update data, and/or rating data), etc. Signature field 212 of the illustrated example of signature record 210 comprises a digital signature (e.g., using the above mentioned private key) of a corresponding data record. For example, the digital signature may comprise the signature function Signature (Data Record)=E(H(Data Record)), where E( ) is an encryption function (e.g., RSA, DSA, ECC, etc.) using the private key and H( ) is a hash function (e.g., message digest algorithm version 5 (MD5), secure hash algorithm 1 (SHA-1), secure hash algorithm 2 (SHA-2), etc.). According to embodiments of the invention, the digital signature is utilized in facilitating auditability and traceability of a corresponding data record (e.g., proof of whom created a data record).

An example of a data structure implemented with respect to a data record is shown in FIG. 2B as data record 220. Data record 220 of the illustrated embodiments comprises a plurality of data fields useful in facilitating auditable data management according to concepts herein. In particular, data record 220 of the embodiment of FIG. 2B includes ID field 221, reference signature ID field 222, public key field 223, type field 224, reference data ID field 225, data field 226, and metadata field 227, as described in further detail below. It should be appreciated that the particular data fields of data record 220 are illustrative of the number, type, configuration, etc. of data fields as may be utilized according to embodiment of the invention. Some embodiments may include more or fewer data fields, as well as different and/or alternative data fields.

In the example of data record 220 shown in FIG. 2B, ID field 221 may comprise an identifier for the data record. An identifier of ID field 221 may, for example, comprise a unique identifier of the data record, such as may be utilized in associating the data record with a corresponding data record (e.g., data record comprising update data and/or rating data). An identifier of reference signature ID field 222 may comprise an identifier of an associated signature record. For example, an identifier value in ID field 211 of an instance of signature record 210 comprising a digital signature for an instance of data record 220 in signature field 212 thereof may be provided as an identifier value in reference signature ID field 222 for use in traceability and/or auditability of the instance of data record 220.

Public key field 223 of embodiments of data record 220 may comprise a public key of a private key public key pair for a digital signature in signature field 212 of an instance of signature record 210 identified by reference signature ID field 222. The public key of public key field 223 may correspond to the user who created the instance of data record 220, such as for use in tracing and/or auditing the instance of data record 220 and/or data therein.

Type field 224 may comprise information regarding the type of the data record. For example, information included in type field 224 of embodiments may identify the instance of data record 220 as of type "New," "Update," or "Rate," such as in correspondence to a particular type of data in one or more further fields of data record 220.

In accordance with some examples of data record 220, data field 226 may comprise the main or payload data of an instance of the data record. For example, data field 226 may include new data (e.g., original data, as may be updated from time-to-time) created by a user for which data management is to be provided by data management system 100. In the example of Geodata, data field 226 may comprise new BIM data with respect to building design, operation, and/or management. Data field 226 may additionally or alternatively include update data corresponding to changes, modifications, revisions, updates, etc. to existing data (e.g., previous new and/or update data) under management by data management system 100. Update data of data field 226 may, for example, comprise updates for some portion of existing data on data management system 100. In the example of Geodata, update data of data field 226 may include one or more updates to Geodata stored on storage 120. Additionally or alternatively, data field 226 may include rating data corresponding to data and/or users of data management system. For example, users of data management system may provide rating information (e.g., ratings from 0 to 1, where 0 is the lowest and 1 is the highest) with respect to data under management by data management system 100 (e.g., to indicate their assessment of the accuracy, validity, veracity, relevance, etc. of particular data under management). Similarly, users of data management system may additionally or alternatively provide rating information (e.g., ratings from 0 to 1, where 0 is the lowest and 1 is the highest) with respect to other users of data management system 100 (e.g., to indicate their assessment of the reliability, veracity, dependability, etc. of particular users of the data management system).

The information included in type field 224 of embodiments of data record 220 corresponds to the type of data included in data field 226 of that instance of data record 220. For example, in the case of data field 226 including new data created by a user for which data management is to be provided by data management system 100, type field 224 may identify the instance of data record 220 as of or including type "New." Similarly, in the case of data field 226 including update data corresponding to changes, modifications, revisions, updates, etc. to existing data under management by data management system 100, type field 224 may identify the instance of data record 220 as of or including type "Update." Further, in the case of data field 226 including rating data corresponding to data and/or users of data management system, type field 224 may identify the instance of data record 220 as of or including type "Rate."

Reference data ID field 225 of embodiments of data record 220 may comprise an identifier of another data record associated with data in data field 226 of the instance of data record 220. For example, an identifier value in ID field 221 of a first instance of data record 220 comprising data updated by data of a second instance of data record 220 including update data in data field 226 may be provided as an identifier value in reference data ID field 225 of the second instance of data record 220. Identification of the first instance of data record 220 using an identifier of reference data ID field 225 of a second instance of data record 220 may be used, for example, for identifying data for cumulative updating using update data of the second instance of data record 220. An identifier value in ID field 221 of a first instance of data record 220 comprising data rated by data of a second instance of data record 220 including rating data in data field 226 may be provided as an identifier value in reference data ID field 225 of the second instance of data record 220. Identification of the first instance of data record 220 using an identifier of reference data ID field 225 of a second instance of data record 220 may be used, for example, for applying the rating to the respective data. An identifier value in ID field 221 of an first instance of data record 220 comprising a public key of a user rated by data of a second instance of data record 220 including rating data in data field 226 may be provided as an identifier value in reference data ID field 225 of the second instance of data record 220. Identification of the first instance of data record 220 using an identifier of reference data ID field 225 of a second instance of data record 220 may be used, for example, for applying the rating to the respective user.

In accordance with some examples of data record 220, metadata field 227 may comprise data providing information about one or more aspects of the data record and/or data thereof. For example, metadata field 227 of an instance of data record 220 of embodiments may include user defined metadata with respect to data of data field 226 of that instance of the data record. Additionally or alternatively, metadata field 227 of an instance of data record 220 of embodiments may include user defined metadata with respect to data of another instance of data record 220 (e.g., identified by reference data ID 225). In the example of Geodata, user defined metadata may comprise location information (e.g., [latitude, longitude]), description information (e.g., "this is a description of the Geodata"), and/or other information about or otherwise related to the Geodata.

In operation according to embodiments of the invention, when a user wants to save data for management by data management system 100, an instance of data record 220 to contain the data and a corresponding signature record are generated (e.g., by data interface logic of one of user devices 130 utilized by the user). The generated signature record and data record may thus be provided to data management platform 110 by the user device (e.g., user device of user devices 130) for storage (e.g., in storage 120) and provision of data management according to concepts herein. Storage of first signature record $210_1$ (e.g., Signature_Record_1) in association with first data record $220_1$ (e.g., Data_Record_1) on storage 120 is shown in FIG. 2C.

The pseudo code below shows an example of payload data comprising Geodata (e.g., Geodata_1) and metadata with respect to the Geodata (e.g., Meta_1) as may be generated (e.g., by data interface logic of user device 130 utilized by the user) for storage in an instance of a data record (e.g., Data_Record_1) of data management system 100.

```
Geodata_1 =
{  "type": "FeatureCollection",
    "features": [{
      "type": "Feature",
      "geometry": {
        "type": "Point",
        "coordinates": [114.14, 22.28]
      },
      "properties": {
        "id": "1234",
        "name": "Hong Kong Park"
      }
    }]}
Meta_1 =
{  "location": [114.17,22.30],
    "Description": "My Favorite Place"}
```

FIG. 3A shows detail with respect to examples of data records as may be generated (e.g., by data interface logic of one or more of user devices 130 utilized by the user) for storage and management by embodiments of data management system 100. Data record $220_1$ (e.g., Data_Record_1) of FIG. 3A illustrates an embodiment of a data record comprising new Geodata in the form of Geodata_1 of the above example generated with respect to a user with public key PK1. According to the example, data record $220_1$ is generated in accordance with the configuration of data record 220 described above. Accordingly, embodiments of data record $220_1$ (e.g., Data_Record_1) contains a unique identifier in ID field $221_1$, a unique identifier for a corresponding signature record (e.g., Signature_Record_1) in reference signature ID field $222_1$, public key PK1 for the user in public key field $223_1$, "New" type designator information in type field $224_1$, "Null" information with respect to a corresponding data field (e.g., the Geodata is not "Update" and/or "Rate", wherein data reference is "Null" if type is "New") in reference data ID field $225_1$, Geodata_1 as the data payload in data field $226_1$, and Meta_1 as the metadata in metadata field $227_1$.

Although not shown in FIG. 3A, an instance of a signature record corresponding to data record $220_1$ is generated (e.g., by data interface logic of one of user devices 130 utilized by the user) according to embodiments in accordance with the configuration of signature record 210 described above to facilitate auditability and traceability of the data record. For example, signature record $210_1$ (e.g., Signature_Record_1) shown in FIG. 2C may be generated with respect to data record $220_1$ and containing a unique identifier in ID field 211 and a digital signature of the data record $220_1$ (e.g., Signature(Data_Record_1)) in signature field 212. The signature record $210_1$ and data record $220_1$ may be stored by data management platform 110 (e.g., by data management logic of data management platform 110) on storage 120 as described above with reference to FIG. 2C.

Storage 120 of embodiments provides immutable storage with respect to data under management of data management platform 110. Immutability, association between data record and signature record comprising a digital signature for the data record, and public key representing the user cooperate to facilitate auditability and traceability of the data record according to embodiments of the invention.

In operation of examples of an immutable configuration of storage 120, no record under data management by data management system will be deleted from storage 120 (e.g., data records and corresponding signature records will remain unaltered and viably stored for the duration of time for which data management is provided with respect to the data therein). Embodiments of the invention may thus implement techniques for efficient storage of data within storage 120. For example, updating of data stored immutably on storage 120 may be provided for by storing difference data for the updates. In accordance with embodiments, update data of data field 226 of an update instance of data record 220 may, for example, comprise differences between two sets of data (e.g., the existing data on data management system 100 and the data as updated by the user), such as for facilitating cumulative updating of the relevant data. In the example of Geodata, update data of data field 226 may comprise differences between two an existing set of Geodata and an updated set of that Geodata. Such configurations of update data facilitate maintaining updated data, even in situations where a number of different parties update the data from time to time, without necessitating storing the complete set of data in multiple instances. Further, embodiments of the invention provide for users tracking the changes with respect to the immutably stored data, whereby users are enabled to check whether their data is outdated and avoid writing outdated data to the storage of the data management system, thus saving storage space.

Figure 3B:
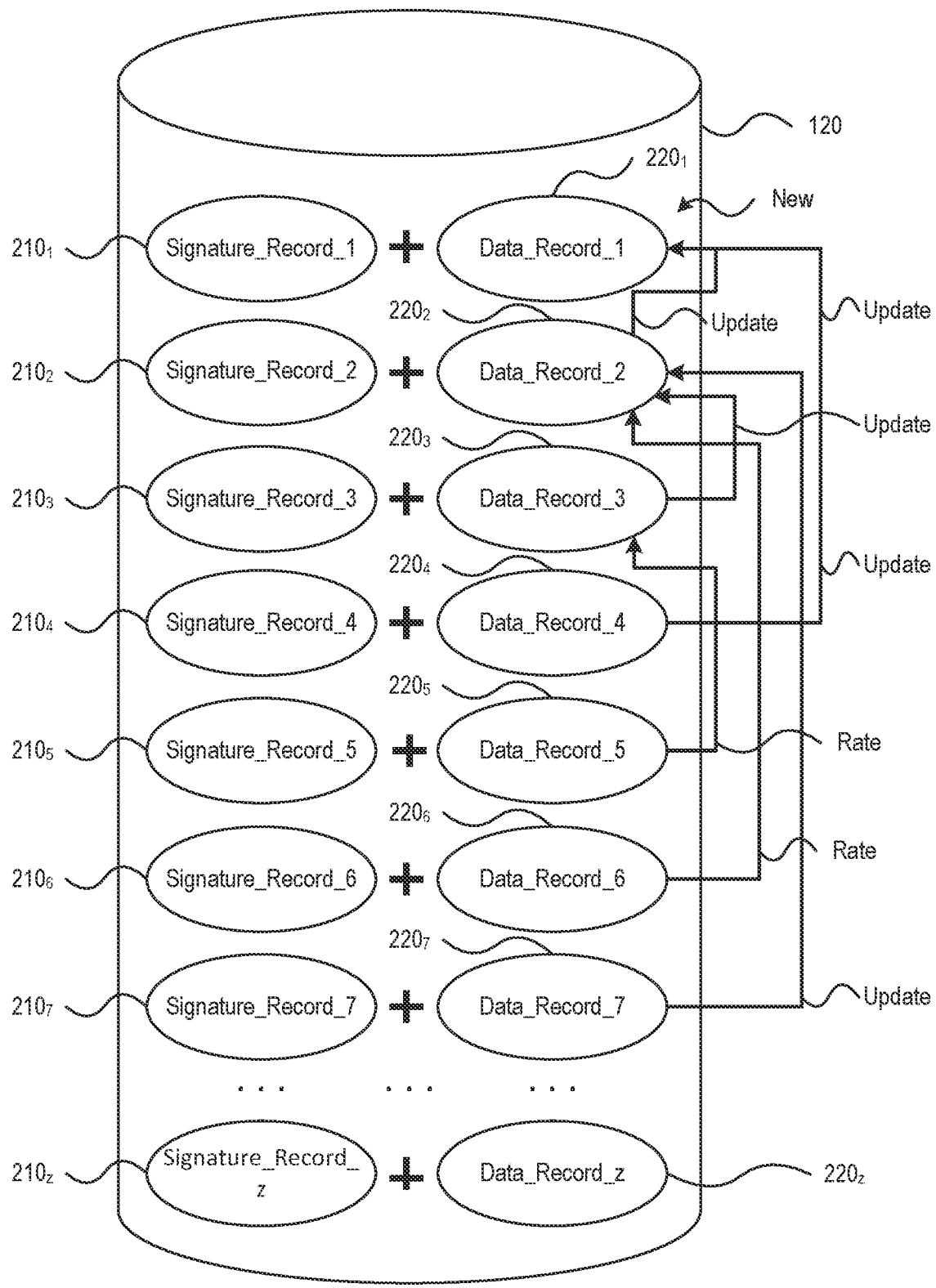
FIG. 3B illustrates storage of signature records in association with corresponding data records on storage of a data management system according to embodiments of the invention.

FIGS. 3A and 3B illustrate the use of data record referencing facilitating efficient data storage of update data comprising differences between two sets of data according to embodiments of the invention. In particular, FIG. 3B shows storage 120 having a plurality of signature records (shown as signature records $210_1$-$210_Z$) and corresponding data records (shown as data records $220_1$-$220_Z$) stored on storage 120. As illustrated in FIG. 3B, data records may be variously related to other data records. For example, data record $220_2$ is related to data record $220_1$ as being update data therefor, data record $220_3$ is related to data record $220_2$ as being update data therefor, data record $220_4$ is related to data record $220_1$ as being update data therefor, and data record $220_7$ is related to data record $220_2$ as being update data therefor.

Data records $220_1$-$220_M$ (e.g., M<Z) of FIG. 3A show detail of example data records implementing the foregoing update data relationships. In the examples of update data records $220_2$ and $220_M$ of FIG. 3A, update data of the respective data field comprises differences between two sets of data (e.g., existing data on data management system 100 and data as updated by the user). In particular, data record $220_2$ provides update data with respect to Geodata_1 in data field $226_1$ of data record $220_1$ as difference data GeoDiff_2 in data field $226_2$. Further, data record $220_M$ provides update data with respect to the update data of GeoDiff_2 in data field $226_2$ of data record $220_2$ as difference data GeoDiff_M in data field $226_M$. These relationships facilitate cumulatively updated data, whereby users are enabled to update their own data or other user's data with differences between two sets of data (e.g., using GeoDiff data with respect to Geodata) according to embodiments of the invention.

The pseudo code below shows an example for a user with public key PK2 having Geodata_2 generating (e.g., by data interface logic of user device 130 utilized by the user) a GeoDiff update with respect to Geodata_1 of the above example. The generated GeoDiff data (GeoDiff_2) may be stored in data record $220_2$ (e.g., Data_Record_2) on storage 120 of data management system 100. Although not shown in the pseudo code below, metadata with respect to the Geodata_2 (e.g., Meta_2) may also be generated, such as shown in the pseudo code above, for storage in data record $220_2$ (e.g., Data_Record_2) on storage 120 of data management system 100.

```
Geodata_2 =
{
    "type": "FeatureCollection",
    "features": [{
        "type": "Feature",
        "geometry": {
            "type": "Point",
            "coordinates": [114.14, 22.28]
        },
        "properties": {
            "id": "1234",
            "name": "Hong Kong Park"
        }
    },
    {
    "type": "Feature",
    "geometry": {
        "type": "Point",
        "coordinates": [114.15, 22.27]
    },
    "properties":  {
        "id":  "4567",
        "name": "Victoria Peak"
    }
    },
    ]
}
GeoDiff_2 = Diff(Geodata_2, Geodata_1)
```

Updated data may be obtained/accessed by a user through operation of data management platform 110 (e.g., by data management logic of data management platform 110) merging the difference data with the referenced data. For example, in response to a user query (e.g., by data interface logic of user device 130 utilized by the user) for Geodata corresponding to Geodata_1, an updated instance of the Geodata may be generated (e.g., by data management logic of data management platform 110) by merging the difference data (GeoDiff_M) of data record $220_M$ with the difference data (GeoDiff_2) of data record $220_2$ and merging the resulting difference data with the Geodata (Geodata_1) of data record $220_1$ (e.g., GeoDiff_M+GeoDiff_2+Geodata_1).

Figure 3C:
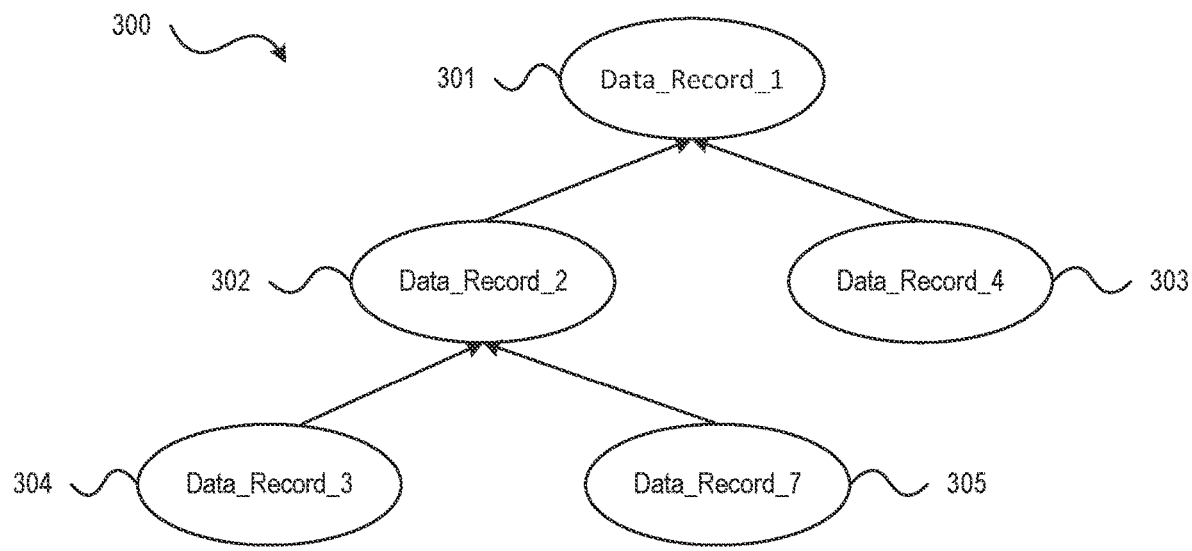
FIG. 3C shows an example of an update tree extracted from references within reference data identification (ID) fields of data records according to embodiments of the invention.

According to embodiments of the invention, an update tree may be utilized with respect to merging data to generate an instance of updated data. For example, an update tree may be extracted (e.g., by data management logic of data management platform 110) from the data records by using the reference data ID fields (e.g., reference data ID fields $225_1$, $225_2$, . . . $225_M$ in the example of FIG. 3A). An example of an update tree is shown in FIG. 3C as update tree 300. The nodes (e.g., leaves 301-305) of update tree 300 of the illustrated embodiment show the cumulative update relationship of the various data of referenced data records as indicated by their respective reference data ID fields. The nodes of update tree 300 may be traversed to merge the data and generate an instance of update data according to embodiments of the present invention.

As should be appreciated from the foregoing, users of data management system 100 of embodiments are enabled to store and/or update data shared by and among different parties, whereby traceability and/or auditability is facilitated with respect to the data. However, merging data to provide an instance of update data may consume appreciable processing time, particularly where a large number of cumulative updates are involved and/or where the data being merged is of considerable complexity. Thus, merging of data may, in some situations (e.g., when performed in response to a real-time query for data by a user), may result in diminished user experience and/or other undesired operation of data management system 100. Accordingly, embodiments of the present invention may implement techniques to improve the query performance with respect to data with many updates, complex updates, etc.

Figure 3D:
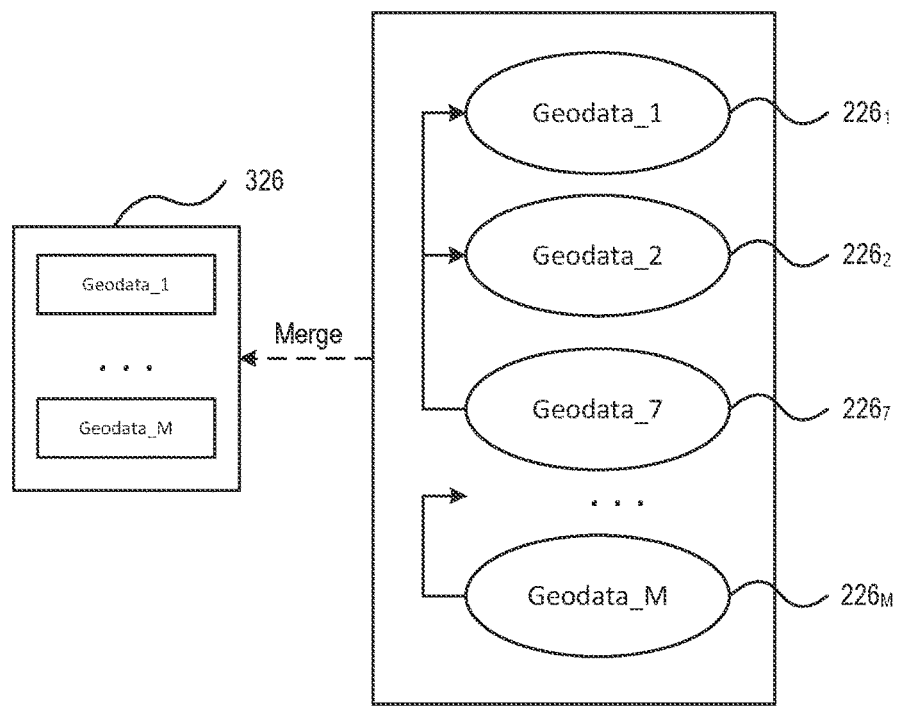
FIG. 3D shows an example of a snapshot of merged data captured with respect to data having a number of updates according to embodiments of the invention.

Techniques for creating snapshots with respect to cumulatively updated data may, for example, be utilized according to embodiment of the invention to provide improved efficiency with respect to data queries involving cumulatively updated data. As illustrated in FIG. 3D, in operation according to a snapshot technique of some examples, a snapshot of merged data (e.g., updated data snapshot 326) may be captured or otherwise generated with respect to data having many updates (e.g., data $226_1, 226_2, 226_7, \ldots 226_M$). The updated data snapshot may be captured in association with an instance of updated data being generated from cumulative update data (e.g., in association with update data being stored on storage of a data management system, in association with a user data query for data including data having updates, etc.), whereby the updated data snapshot is utilized to avoid delays in merging update data for subsequent queries for that data. For example, data management platform 110 (e.g., data management logic of data management platform 110) may return a pre-generated updated data snapshot to the user (e.g., user device 130 used by the user) instead of querying and merging all the updates for particular data queried by the user.

In operation according to embodiments, data management platform 110 (e.g., data management logic of data management platform 110) may monitor the process time of getting data from Geodata_1 to Geodata_M (e.g., Geodata_M being a node in the relevant update tree) for determining when an updated data snapshot is to be captured. The process time may for merging data may be represented as $$\text{ProcessTime}_{Geodata\_1\ to\ Geodata\_M} = \Sigma_{k=1}^{M}(\text{Query}(K) + \text{Merge}(K)),$$

where Query(K) is the time to query the K record from the storage and Merge(K) is the time to merge the K record to the merged Geodata.

According to some examples, a threshold time (Ttime) may be utilized with respect to the process time for the update data in determining if an updated data snapshot is to be captured. For example, if ProcessTime$_{Geodata\_1\ to\ Geodata\_M}$>Ttime an updated data snapshot record may be created on the storage. The value of a threshold time (Ttime) provides control with respect to how frequently updated data snapshots are captured. Implementations having more updated data snapshots (e.g., lower value of Ttime) will generally experience improved response times, but generally will correspondingly use more storage space and may cause heavy loading of the data management platform server. The threshold time (Ttime) utilized with respect to updated data snapshots may be preset, such as based on a value to facilitate a desired level of quality of service. For example, the threshold time may be selected to be within the range of from 0.1 second to 10 seconds. In accordance with some examples, the threshold time is selected to be within the range of from 0.5 second to 5 seconds (e.g., 0.5 s, 1 s, 1.5 s, 2 s, 2.5 s, 3 s, 3.5 s, 4 s, 4.5 s, or 5 s). In accordance with some embodiments, the value of the threshold time (Ttime) may initially be a value of high end of a range (e.g., 10 s), and thereafter decreased (e.g., after observing data management system performance, as more computing resource are available, etc.) to further increase the performance to desired or acceptable levels.

Figure 4A:
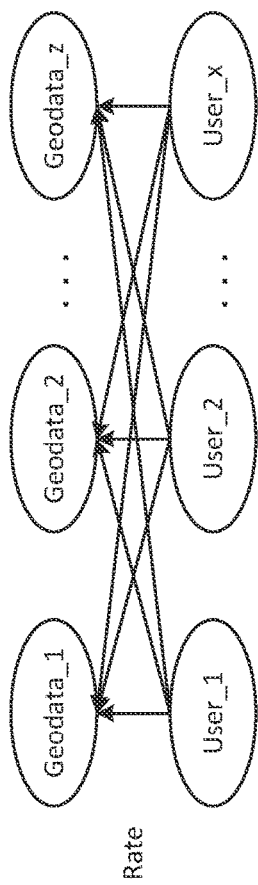
FIG. 4A illustrates user capability to rate any data of a data management system according to a collaborative rating technique of embodiments of the invention.
Figure 4B:
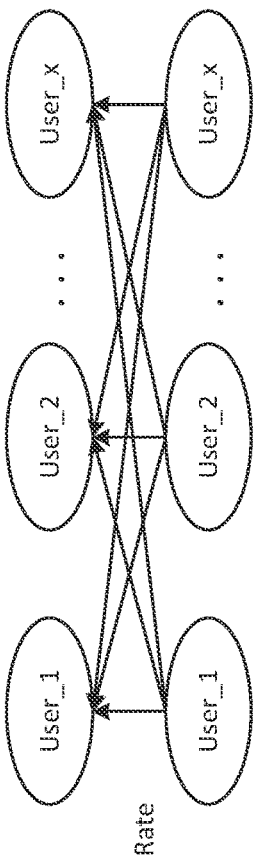
FIG. 4B illustrates user capability to rate any user of a data management system according to a collaborative rating technique of embodiments of the invention.
Figure 5:
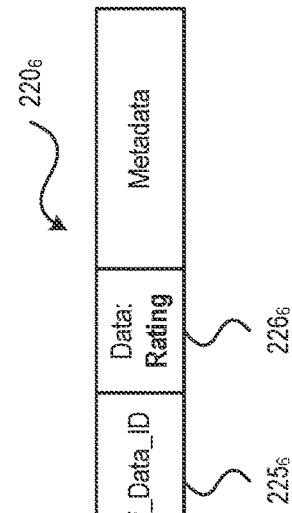
FIG. 5 shows detail with respect to an examples of a data record for rating data as may be generated for storage and management by embodiments of a data management system according to embodiments of the invention.

Embodiments of the invention may implement collaborative rating techniques, such as to facilitate data validation. In accordance with some examples of a collaborative rating technique, a user may rate any data (e.g., as represented in FIG. 4A) and/or any other users (e.g., as represented in FIG. 4B) of data management system 100. For example, a user may create (e.g., by operation of data interface logic of user device 130 utilized by the user) a rating type data record in accordance with the configuration of data record 220 described above. Accordingly, as illustrated in FIG. 3B, data records may be related to other data records not only as update type data records, but also as rating type data records. For example, data record $220_5$ is related to data record $220_3$ as being rating data therefor and data record $220_6$ is related to data record $220_2$ as being rating data therefor. Such rating type data records may, for example, provide rating information with respect to data and/or rating information with respect to other users as described above. In the example of FIG. 5, data record $220_6$ provides rating data with respect to the data (e.g., Geodata_2) and/or user (e.g., user with public key PK2) having provided the data in data field $226_2$ of data record $220_2$ as rating data Rating in data field $226_6$. In this example, reference data ID field $225_6$ includes information identifying data record $220_2$ (Data_Record_2).

The pseudo code below shows an example for a user giving a rating of another user and Geodata and generating (e.g., by data interface logic of user device 130 utilized by the user) rating data. The generated rating data may be stored on storage 120 in the data field of a data record referencing another data record for which the user and data is being rated. The pseudo code below also shows an example of metadata with respect to the rating data as may also be generated for storage in the data record.

---

Rating = {"user_rating": "0.9", "geodata_rating": "1"}
Meta_6 =
{
  "Comment_To_User": "Generally, the user is worthy of trust.",
  "Comment_To_Geodata": "The geodata was verified to be accurate."
}

---

Ratings implemented according to embodiments of the present invention may be utilized to provide a trust level with respect to the data under management by data management system 100. In providing trust levels of a collaborative rating implementation, embodiments of the invention may utilize one or more ratings matrices comprising rating data and operate to perform matrix operations with respect to the ratings to calculate trust levels. For example, data management logic of data management platform 110 may scan through the data records stored on storage 120, or some portion thereof, to gather rating information provided with respect thereto (e.g., as may be obtained from rating type data records) and generate the one or more ratings matrices. Rating information may, for example, be scanned periodically for generating and/or updating the one or more ratings matrices. Additionally or alternatively, one or more ratings matrices may be generated or updated in association with data records comprising rating data being stored on storage of a data management system.

User rating data of embodiments comprises user/user ratings (UUR) by user/user rating pairs (e.g., one user rating another user). The table below shows an example of the user/user rating pairs (e.g., rating pair 12 for User_1 rating User_2) of an embodiment of data management system 100 for which ratings may be collected.

| Users/Users | User_1 | ... | User_x |
|---|---|---|---|
| User_1 | UUR_11 | ... | UUR_1x |
| ... | ... | ... | ... |
| User_x | UUR_x1 | ... | UUR_xx |

The rating information for each user/user rating pair may be designated using paring designations corresponding to those of the user/user pairs in the table above (e.g., rating UUR_1x corresponds to user/user rating pair User_1/User_x). An example of a user ratings matrix, as may be generated to comprise rating information for the user/user rating pairs according to embodiments of the invention is shown below.

$$A_{x,x} = \begin{bmatrix} UUR\_11 & ... & UUR\_1x \\ ... & ... & ... \\ UUR\_x1 & ... & UUR\_xx \end{bmatrix}$$

Additionally or alternatively, user rating data of embodiments comprises ratings (UDR) by user/data rating pairs (e.g., one user rating particular data). The table below shows of the user/data rating pairs in an example where the data comprises Geodata (e.g., rating pair 12 for User_1 rating Geodata_2) of an embodiment of data management system 100 for which ratings may be collected.

| User/Data | Geodata_1 | ... | Geodata_z |
|---|---|---|---|
| User_1 | UDR_11 | ... | UDR_1z |
| ... | ... | ... | ... |
| User_x | UDR_x1 | ... | UDR_xz |

The rating information for each user/data rating pair may be designated using paring designations corresponding to those of the user/data pairs in the table above (e.g., rating UDR_1z corresponds to user/data rating pair User_1/Geodata_z). An example of a data ratings matrix, as may be generated to comprise rating information for the user/data rating pairs according to embodiments of the invention is shown below.

$$B_{x,z} = \begin{bmatrix} UDR\_11 & ... & UDR\_1z \\ ... & ... & ... \\ UDR\_x1 & ... & UDR\_xz \end{bmatrix}$$

Embodiments of the invention utilize ratings matrices, such as the above user ratings matrix (A) and data ratings matrix (B), to calculate trust levels (T) with respect to data under management by data management system 100. For example, data management logic of data management platform 110 may perform one or more operations with respect to ratings matrices for calculating trust levels according to some embodiments.

Matrix operations comprising vectorizing a transposition of a matrix product of user ratings and data ratings matrices (e.g., $T_{z,1} = [A \times B]^T \times \vec{1}$) may be used to calculate trust levels of embodiments. This example of ratings matrix operations computes trust levels which are a combination of user ratings and data ratings, thereby providing multidimensionally based trust levels with respect to the data of data management system 100.

In a simplified example of the aforementioned matrix operations, a user ratings matrix may be provided as $$A_{2,2} = \begin{bmatrix} 1 & 0.7 \\ 0.8 & 1 \end{bmatrix},$$

a data ratings matrix may be provided as $$B_{2,2} = \begin{bmatrix} 1 & 0.5 \\ 1 & 1 \end{bmatrix},$$

and a vectorization matrix may be provided as $$\vec{1} = \begin{bmatrix} 1 \\ 1 \end{bmatrix}.$$

Application of the matrix operations in this example provides $$T_{z,1} = [A \times B]^T \times \vec{1} = \begin{bmatrix} 3.5 \\ 2.6 \end{bmatrix},$$

where $T_{1,1}=3.5$ and $T_{2,1}=2.6$. In this example, $T_{1,1} > T_{2,1}$, and thus Geodata_1 has a higher trust level.

It should be appreciated that, in operation of a collaborative rating technique in which users give data and/or other users ratings, a user may provide unfair or otherwise inaccurate ratings. Such inaccurate ratings may be readily discovered, such as when the correctness of the data is validated (e.g., by another user), when a user's ratings regularly or consistently fall outside of corresponding ratings from other users, etc. A feedback mechanism with respect to users ratings may be implemented (e.g., based upon direct feedback about a user's ratings from another user, based upon a comparison of a user's ratings to corresponding ratings by other users, etc.) whereby action may be taken to lessen the impact of ratings made by a user determined to have been inaccurate. For example, the ratings made by a user determined to have been inaccurate may be omitted from the above matrices, may be weighted less in the matrix operations, or the contribution from those ratings can otherwise be lowered.

Utilizing rating information provided with respect to particular data, a user of data management system 100 may correspondingly adjust their time and/or effort spent to validate the data (e.g., based on a trust level provided with respect to a user having supplied the data and/or a trust level provided with respect to the particular data). For example, a user may only spend time to validate particular data having a relatively low trust level (e.g., data having trust levels in a lowest percentile, such as trust levels in the bottom 10%, 25%, 33%, or 50% of the trust levels for data of a database, data having trust levels below a threshold value, etc.). Trust levels implemented according to embodiments of data management system 100 may thus facilitate efficient and effective validation of the data.

Figure 6:
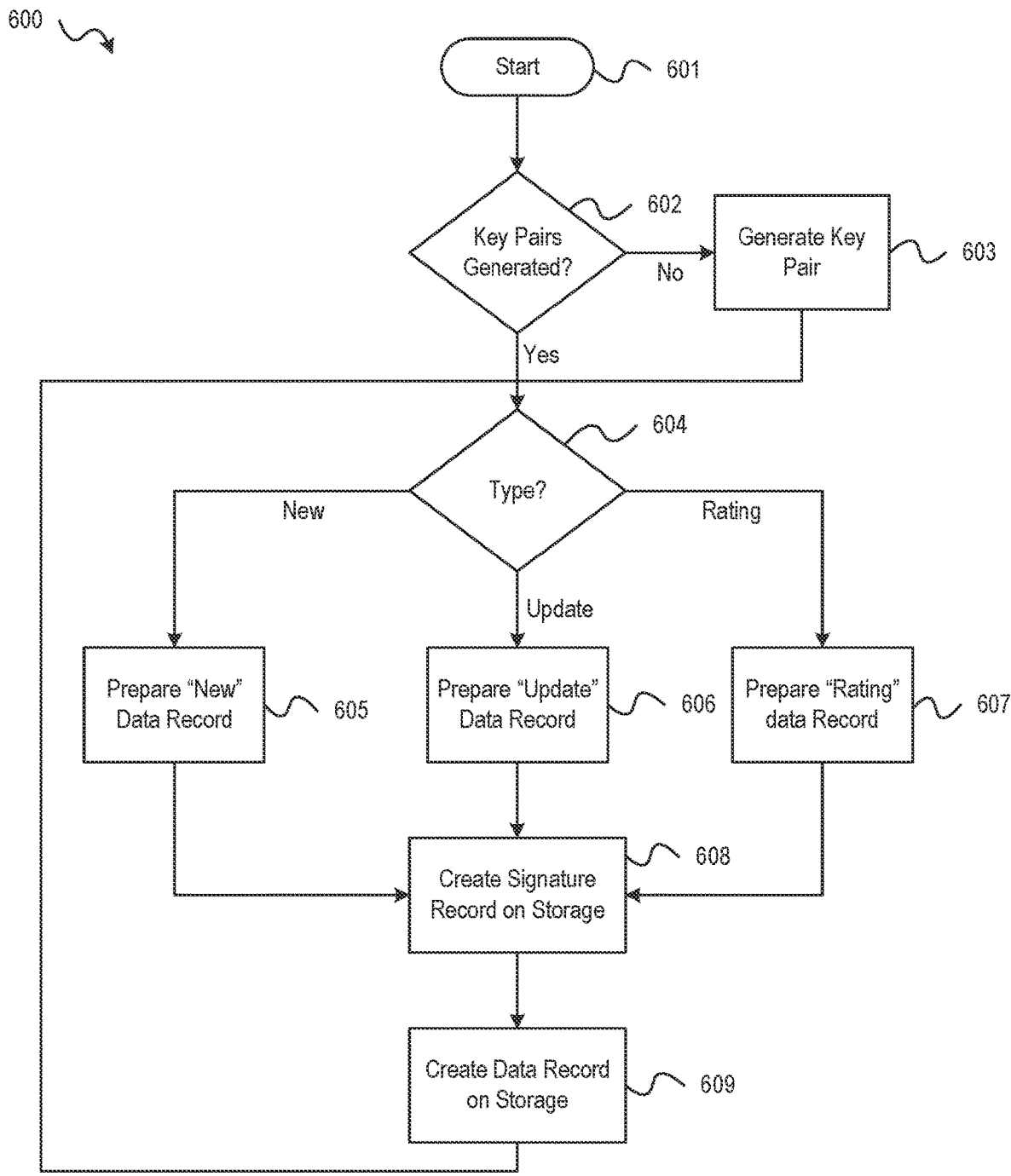
FIG. 6 shows an example flow diagram for operation by a client system of a client-server data management system implementation according to embodiments of the invention.
Figure 7:
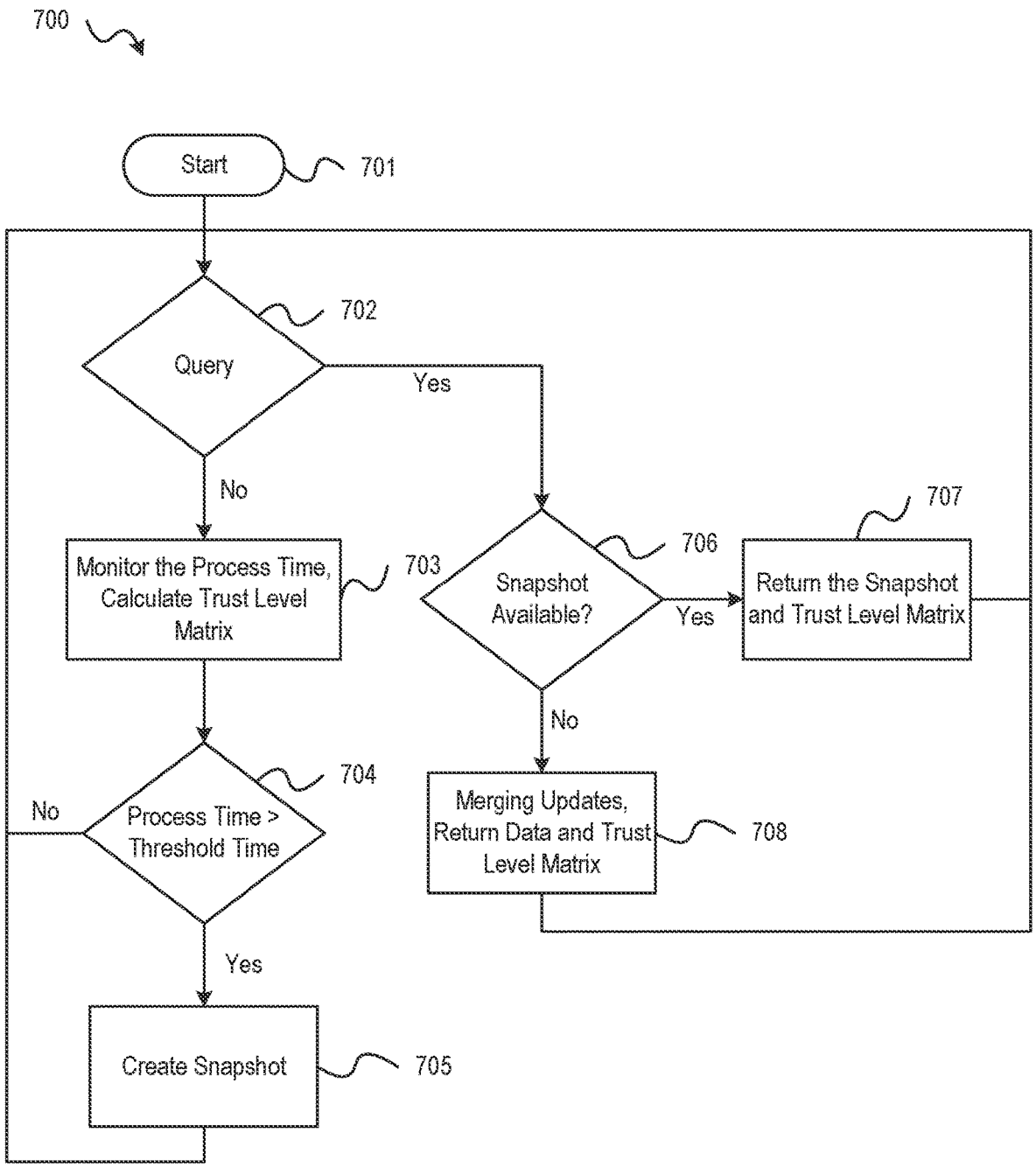
FIG. 7 shows an example flow diagram for operation by a server system of a client-server data management system implementation according to embodiments of the invention.

FIGS. 6 and 7 provide high level flow diagrams providing operation by embodiments of the present invention in accordance with examples described above. In particular, FIG. 6 shows operation by a client system (e.g., user devices 130 executing data interface logic for performing functions as described herein) of a client-server data management system implementation. Correspondingly, FIG. 7 shows operation by a server system (e.g., data management platform 110 executing data management logic for performing functions as described herein) of a client-server data management system implementation.

Referring first to FIG. 6, a user performing one or more activities for storing data on a data management system of embodiments of the invention may cause flow 600 of the client system operation to initiate at block 601. For example, a user having created, update, and/or rated data under management by data management platform may cause a client system (e.g., user device 130) to initiate flow 600 for storing the data on storage of the data management system.

After having been initiated, processing according to flow 600 of the illustrated embodiment proceeds to block 602 wherein a determination is made regarding whether one or more private key and public key pairs for use in the data management system with respect to the user have been generated. If it is determined that the requisite private key and public key pair(s) have not already been generated, processing according to the illustrated embodiment proceeds to block 603 for generating the private key and public key pair(s), and thereafter proceeds to block 604 for determining a type of data for storing on storage of the data management system. If, however, it is determined at block 602 that the requisite private key and public key pair(s) have already been generated, processing according to the illustrated embodiment proceeds to block 604 for determining a type of data for storing on storage of the data management system.

At block 604 of the illustrated embodiment a determination is made regarding a type of the data record to be stored on storage of the data management system. For example, a data record may be identified to be of type "New," "Update," or "Rate" in correspondence to a particular type of data generated or otherwise provided by the user. If it is determined that the type of data record is "New", processing according to the illustrated embodiment proceeds to block 605 for preparing a data record comprising new data for storage by the data management system. If, however, it is determined that the type of data record is "Update", processing according to the illustrated embodiment proceeds to block 606 for preparing a data record comprising update data for storage by the data management system. Similarly, if it is determined that the type of data record is "Rating", processing according to the illustrated embodiment proceeds to block 607 for preparing a data record comprising rating data for storage by the data management system.

In accordance with the example of flow 600, after having generated a data record (e.g., a "New" data record at block 605, an "Update" data record at block 606, or a "Rating" data record at block 607), processing according to the illustrated embodiment proceeds to block 608 for preparing a signature record. For example, a signature record comprising a digital signature of the data record may be generated for storing on the data management system in association with the data record.

At block 609, the data record and corresponding signature record are provided for storage on the data management system. For example, the client system (e.g., user device 130) may transmit the data record and signature record to a server system (e.g., data management platform 110) for recording on storage media thereof (e.g., storage 120).

Referring now to FIG. 7, a client system performing one or more activities with respect to a data management system of embodiments of the invention may cause flow 700 of server system operation to initiate at block 701. For example, a user having created, update, and/or rated data under management by data management platform may cause a client system (e.g., user device 130) to transmit a data record and associated signature record to a server system (e.g., data management platform 110) for storage, thereby causing flow 700 to be initiated by the server system for storing the data on storage of the data management system. Additionally or alternatively, a user accessing or otherwise querying data under management of a data management system may cause a client system (e.g., user device 130) to transmit a data query to a server system (e.g., data management platform 110) to access data, thereby causing flow 700 to be initiated by the server system for retrieving data stored on the data management system.

After having been initiated, processing according to flow 700 of the illustrated embodiment proceeds to block 702 wherein a determination is made regarding whether the activity comprises a data query. For example, a client system may perform various activities with respect a data management system, such as to cause data to be stored on storage thereof, to access or otherwise query data under management of a data management system, etc. Operation according to block 702 makes a determination regarding the activity being performed and provides branching of according to flow 700 for providing corresponding functionality.

If, at block 702, it is determined that the activity does not comprise a data query (e.g., data is to be stored on storage of the data management system), processing according to the illustrated embodiment proceeds to block 703 for performing appropriate operations with respect to the data, monitoring process time with respect to the data, and/or calculating trust levels with respect to the data. For example, if the activity comprises storing a data record and associated signature record on storage of the data management system, operations to accomplish the storage of those records and to place the data under management of the data management system may be performed. Additionally or alternatively, if the activity is with respect to update data (e.g., a data record comprising update data is being stored), operations to merge the data may be performed and the processing time to do so monitored. Similarly, if the activity is with respect to rating data (e.g., a data record comprising rating data is being stored), operations to generate or update trust levels may be performed.

At block 704 of the illustrated example a determination is made regarding whether a monitored processing time exceeds a threshold time. For example, where the activity includes performing operations at block 703 for which a processing time is monitored (e.g., the activity is with respect to update data and the processing time for merging the update data is monitored), the processing time may be compared to a threshold time (e.g., Ttime). In accordance with the illustrated example of flow 700, if it is determined that the monitored processing time does not exceed the threshold time, operations with respect to this instance of the activity has completed and processing returns to block 702 for processing with respect to subsequent activity. However, if it is determined that the monitored processing time exceeds the threshold time, processing according to the illustrated embodiment proceeds to block 705 wherein a snapshot of data is captured (e.g., an updated data snapshot of merged data) and processing returns to block 702 for processing with respect to subsequent activity.

Having described the branch of flow 700 corresponding to a determination at block 702 that the activity does not comprise a query, the branch of the illustrated embodiment of flow 700 corresponding to a determination at block 702 does comprise a query will now be described. If, at block 702, it is determined that the activity does comprise a data query (e.g., data stored on storage of the data management system is being accessed or otherwise queried), processing according to the illustrated embodiment proceeds to block 706 for a determination regarding whether a snapshot (e.g., an updated data snapshot) is available with respect to data of the query. If, at block 706, it is determined that a snapshot is available with respect to data of the query, processing according to the illustrated embodiment proceeds to block 707 where the snapshot (e.g., an updated data snapshot) and trust level with respect to the data is returned (e.g., transmitted by the server system to the client system). If, however, it is determined that a snapshot is not available with respect to data of the query, processing according to the illustrated embodiment proceeds to block 708 where the data (e.g., including any update data being merged therein) and trust level with respect to the data is returned (e.g., transmitted by the server system to the client system).

In accordance with some embodiments, operations performed at block 708 may include monitoring the process time (e.g., as described with respect to block 703), determining if the process time exceeds a threshold time (e.g., as described with respect to block 704), and capturing a snapshot if the process time exceeds a threshold time (e.g., as described with respect to block 705). Accordingly, accessing or otherwise querying data which results in process time exceeding a threshold time may trigger capturing a snapshot (e.g., an updated data snapshot) for use in improving query response with respect to subsequent queries. Such monitoring the process time, determining if the process time exceeds a threshold time, and capturing a snapshot if the process time exceeds a threshold time at block 708 may be in addition to or in the alternative to corresponding operations being performed at blocks 703, 704, and 705 of embodiments of the invention.

In accordance with the example of flow 700, after having returned the data and trust level with respect to the data (e.g., snapshot and trust level returned at block 707 or data and trust level returned at block 708), processing according to the illustrated embodiment proceeds to block 702 for processing with respect to subsequent activity. Thereafter, the server system may monitor for subsequent activity by one or more client systems.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method comprising:
    storing, by a data management platform of a data management system, a plurality of data records on immutable storage of the data management system, wherein the plurality of data records include data records of type new comprising original data stored by the data management system, data records of type update comprising update data for original or other update data stored by the data management system, and data records of type rating comprising rating data with respect to original data or update data stored by the data management system or a user of the data management system;
    storing, by the data management platform, a plurality of signature records on the immutable storage of the data management system, wherein each signature record of the plurality of signature records is associated with a corresponding data record of the plurality of data records, and wherein the signature record comprises a digital signature with respect to the corresponding data record associating the data record with a particular user entity using the data management system;
    generating, by the data management platform, trust levels for the original data of the type new data records and the update data of the type update data records of the plurality of data records based upon the rating data of the type rating data records of the plurality of data records;
    receiving, by the data management platform from a user device, a query for requested data under management of the data management system;
    obtaining, by the data management platform from the immutable storage, the requested data from one or more data records of the plurality of data records; and
    returning, by the data management platform to the user device, the requested data with corresponding one or more of the trust levels generated with respect to the one or more data records from which the requested data is obtained.

2. The method of claim 1, wherein the data records of type rating comprise a reference data identification field comprising information identifying a particular data record of type new or of type update for which rating information is provided with respect to at least one of a user associated with the data record or data of the data record.

3. The method of claim 1, wherein the data records of type update comprise a reference data identification field comprising information identifying a particular data record of type new or of type update for which update data is provided with respect to data of the data record.

4. The method of claim 1, wherein the update data comprises difference data regarding differences between two sets of data.

5. The method of claim 4, further comprising:
    monitoring, by the data management system, process time with respect to merging data of the update data, wherein the process time is a duration of processing time used for merging data of the update data to provide an instance of updated data comprising merged data; and capturing, by the data management system, a snapshot of the merged data if the process time exceeds a threshold time.

6. The method of claim 5, wherein the returning the requested data comprises returning data of a snapshot for requested data that comprises update data for which a corresponding snapshot of merged data has been captured.

7. The method of claim 1, wherein generating the trust levels comprises a matrix operation on the rating data of the type rating data records of the plurality of data records.

8. The method of claim 7, wherein matrices utilized in the matrix operation include a user rating matrix and a data rating matrix, and wherein the trust levels comprise multi-dimensionally based trust levels from a combination of user ratings and data ratings.

9. A method comprising:

providing, by a user device of a data management system to a data management platform of the data management system, a data record for storing on immutable storage of the data management system with a plurality of data records under management by the data management system, wherein the plurality of data records include data records of type new comprising original data stored by the data management system, data records of type update comprising update data for original or other update data stored by the data management system, and data records of type rating comprising rating data with respect to original data or update data stored by the data management system or a user of the data management system, wherein the data record provided for storage by the user device is a data record of type new, update, or rating in correspondence to the plurality of data records under management by the data management system;

providing, by the user device to the data management platform, a signature record for storing on the immutable storage of the data management system with a plurality of signature records that are each associated with a corresponding data record of the plurality of data records, and wherein the signature record comprises a digital signature with respect to a particular user entity associated with the user device;

querying, by the user device from the data management platform, requested data under management of the data management system; and receiving, by the user device from the data management platform, the requested data with corresponding one or more trust levels, wherein the one or more trust levels are generated with respect to one or more data records from which the requested data is obtained based upon the rating data of the type rating data records of the plurality of data records.

10. The method of claim 9, further comprising:

generating, by the user device, a private key public key pair;

generating, by the user device, the digital signature based upon the data record using a private key of the private key public key pair; and including, by the user device, the digital signature in a data structure of the signature record, wherein the signature record includes an identification field including unique identification information for the signature record and a signature field including the digital signature.

11. The method of claim 9, wherein the data records of type rating comprise a reference data identification field comprising information identifying a particular data record of type new or of type update for which rating information is provided with respect to at least one of a user associated with the data record or data of the data record.

12. The method of claim 9, wherein the data records of type update comprise a reference data identification field comprising information identifying a particular data record of type new or of type update for which update data is provided with respect to data of the data record.

13. The method of claim 9, wherein the update data comprises difference data regarding differences between two sets of data.

14. The method of claim 13, wherein the requested data as received by the user device comprises data of a snapshot for requested data that includes update data for which a corresponding snapshot of merged data has been captured.

15. The method of claim 14, wherein the snapshot has been captured in response to a process time with respect to merging data of the update data exceeding a threshold time, wherein the process time is a duration of processing time used for merging data of the update data to provide an instance of updated data comprising merged data.

16. The method of claim 9, wherein the trust levels have been generated from a matrix operation on the rating data of the type rating data records of the plurality of data records, and wherein matrices utilized in the matrix operation include a user rating matrix and a data rating matrix, and wherein the trust levels comprise multidimensionally based trust levels from a combination of user ratings and data ratings.

17. The method of claim 9, further comprising:

adjusting a time spent on validating the requested data as received by the user device from the data management platform based upon the corresponding one or more trust levels.

18. A system comprising:

immutable storage storing a plurality of data records under management of a data management system and storing a plurality of signature records each associated with a corresponding data record of the plurality of data records, wherein the plurality of data records include data records of type new comprising original data stored by the data management system, data records of type update comprising update data for original or other update data stored by the data management system, and data records of type rating comprising rating data with respect to original data or update data stored by the data management system or a user of the data management system, and wherein the signature records comprise a digital signature with respect to the corresponding data record associating the data record with a particular user entity using the data management system; and a data management platform of the data management system in communication with one or more user devices of the data management system, wherein the data management platform is configured to generate trust levels for the original data of the type new data records and the update data of the type update data records of the plurality of data records based upon the rating data of the type rating data records of the plurality of data records, to receive a query from a user device of the one or more user devices for requested data under management of the data management system, to obtain the requested data from one or more data records of the plurality of data records, and to return the requested data to the user device with corresponding one or more of the trust levels generated with respect to the one or more data records from which the requested data is obtained.

19. The system of claim 18, wherein the update data comprises difference data regarding differences between two sets of data, wherein the data management platform is configured to monitor process time with respect to merging data of the update data, and to capture a snapshot of merged data if the process time exceeds a threshold time, and wherein the process time is a duration of processing time used for merging data of the update data to provide an instance of updated data comprising merged data.

20. The system of claim 18, wherein the data management platform is configured to generate the trust levels using a matrix operation on the rating data of the type rating data records of the plurality of data records, wherein matrices utilized in the matrix operation include a user rating matrix and a data rating matrix, and wherein the trust levels comprise multidimensionally based trust levels from a combination of user ratings and data ratings.

* * * * *